United States Patent Office 3,133,935
Patented May 19, 1964

3,133,935
DIBENZO [a,d][1,4]CYCLOOCTADIENES
Stanley O. Winthrop and Martin A. Davis, Montreal, Quebec, Canada, assignors to American Home Products Corporation, New York, N.Y., a corporation of Delaware
No Drawing. Filed Jan. 8, 1962, Ser. No. 165,012
3 Claims. (Cl. 260—313)

This invention relates to a novel chemical compound, a 5-substituted dibenzo [a,d][1,4]cyclooctadiene, and to its salts with pharmacologically acceptable acids. It is also concerned with a process by which the new chemical compounds may be prepared.

More particularly, our invention relates to the 5-substituted dibenzo [a,d][1,4]cyclooctadiene of the formula:

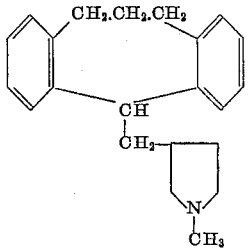

and to its salts with pharmacologically acceptable acids.

This compound, in base form, is the compound 5-(N-methyl-3'-pyrrolidylmethyl)dibenzo [a,d][1,4]cyclooctadiene.

The new compounds, both in base form, and in the form of its acid addition salts with pharmacologically acceptable acids, are pharmacologically active, exhibiting a spectrum of pharmacological activities characteristic of tranquillizers and antidepressant drugs. As such, these compounds potentiate narcosis, and influence conditioned responses in animals at doses one-eighth to one-quarter of the dose causing ataxia. However, the compounds do not influence animal responses to aversive stimuli in subataxic doses. Moreover, when administered either orally or by injection, the compounds protect animals from electrically-induced convulsions in doses less than one-half of the ataxic dose. These compounds are also characterized by a very low order of mydriatic effects. They are therefore of value in medicine as tranquillizers and as antidepressant drugs.

The compounds may be administered in the form of their water-soluble salts in solid dosage forms, such as tablets or capsules, these products containing an excipient such as, for example, lactose; a disintegrating agent such as, for example, starch; and, if advantageous, a lubricant such as, for example, magnesium stearate. Such oral dosage forms may be administered so as to provide from 100–300 milligrams of the active compounds per day.

In preparing the new compounds we prefer to utilize, as the starting material, the compound 5-ketodibenzo [a,d][1,4]cyclooctadiene. This compound may be prepared by heating of 2-(3'-phenylpropyl)benzoic acid with polyphosphoric acid. The compound 2-(3'-phenylpropyl)benzoic acid may be prepared in accordance with the procedure described in J.A.C.S., Volume 77 (1955), page 5078.

In preparing our new chemical compound, 5-(N-methyl-3'-pyrrolidylmethyl)dibenzo [a,d][1,4]cyclooctadiene, the compound 5-ketodibenzo [a,d][1,4]cyclooctadiene may be reacted with a Grignard reagent of the formula:

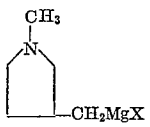

where X is a halogen. This results in an intermediate 5-hydroxy substituted compound, which may be isolated by conventional means after decomposing the Grignard reagent. The latter is then converted to the desired compound, 5-(N-methyl-3'-pyrrolidylmethyl)dibenzo [a,d]-[1,4]cyclooctadiene, by treating the 5-hydroxy substituted compound with an agent which effects dehydration and reduction at the same time such as, for example, hydriodic acid and red phosphorus.

This reaction is preferably carried out in an appropriate solvent as, for example, glacial acetic acid.

The sequence of reactions described may be illustrated as follows:

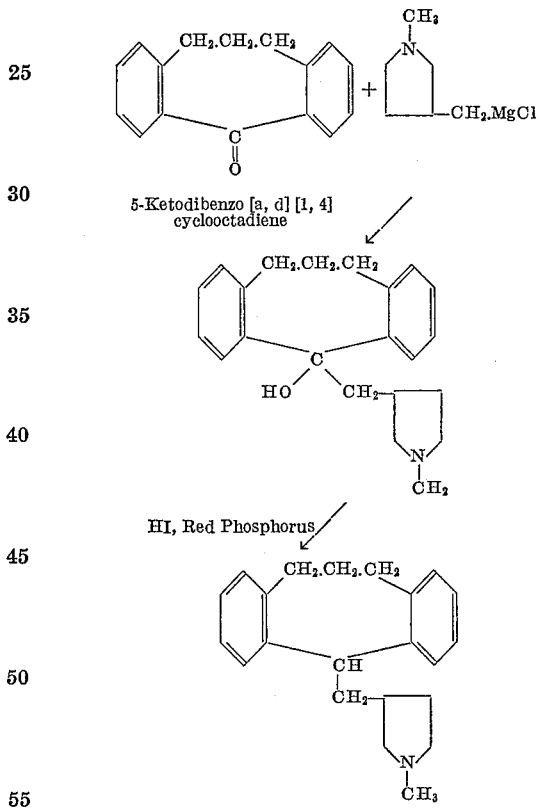

Further details of our process for the preparation of these novel compounds will be found in the illustrative examples which follow.

EXAMPLE 1

*5-Hydroxy-5-(N-Methyl-3'-Pyrrolidylmethyl)Dibenzo [a,d][1,4]Cyclooctadiene*

Magnesium turnings (9.8 grams, 0.2 mole) was covered with tetrahydrofuran. A crystal of iodine and a few drops of ethylbromide were then added to initiate the formation of a Grignard reagent. N-methyl-3-pyrrolidylmethyl chloride (26.7 grams, 0.2 mole) in tetrahydrofuran was then added, dropwise, while heating at reflux. After a few minutes the exothermic reaction commenced. The addition was completed in 20 minutes and heating was continued for an additional hour. Dibenzo [a,d][1,4]-cyclooctadiene-5-one (22.2 grams 0.1 mole) was then added dropwise at a rate sufficient to maintain refluxing. The addition was complete in 20 minutes. The reaction mixture was then heated at reflux for an additional 16 hours. The Grignard complex was then decomposed by adding the reaction mixture to 500 ml. of an ice and ammonium chloride mixture, with stirring. The product precipitated as an oil and was taken up in chloroform. On stripping down the chloroform, there were obtained 26 grams of solid product, melting point 123–130° C. Three recrystallizations from isopropanol gave an analytical sample of 5-hydroxy - 5 - (N-methyl-3'-pyrrolidylmethyl)dibenzo [a,d][1,4]cyclooctadiene, melting point 134–136° C.

Analysis confirmed the empiric formula $C_{22}H_{27}NO$.—Required: C, 82.20; H, 8.47; N, 4.36%. Found: C, 81.55; H, 8.56; N, 4.25%.

EXAMPLE 2

*5-(N-Methyl-3'-Pyrrolidylmethyl)Dibenzo [a,d][1,4]Cyclooctadiene*

The appropriate alcohol 5-hydroxy - 5 - (N - methyl-3'-pyrrolidylmethyl)dibenzo [a,d][1,4]cyclooctadiene, (11.2 gm.) was reduced in the usual manner with 56 ml. of hydriodic acid, 11 gm. of red phosphorus in 250 ml. of glacial acetic acid to yield 8.8 gm., of product, free base, as an oil. It was purified by distillation, B.P. 158–160° C. at 0.13 mm., to give 5.6 gm. of 5-(N-methyl-3'-pyrrolidylmethyl)dibenzo [a,d][1,4]cyclooctadiene.

Analysis confirmed the empiric formula $C_{22}H_{27}N$.—Required: C, 86.50; H, 8.91; N, 4.59%. Found: C, 86.60; H, 8.97; N, 4.67%.

This was converted to its hydrochloride salt in the usual manner, 5.6 gm., M.P. 222–224° C. One recrystallization from isopropanol-ether raised the melting point to 224–226° C.

Analysis confirmed the empiric formula $C_{22}H_{28}NCl$.—Required: C, 77.30; H, 8.24; N, 4.09; Cl, 10.38%. Found: N, 3.80; Cl, 9.91%.

We claim:
1. A compound selected from the group which consists of 5-(N-methyl - 3'-pyrrolidylmethyl)dibenzo [a,d][1,4]-cyclooctadiene and its salts with pharmacologically acceptable acids.
2. 5-(N - methyl - 3' - pyrrolidylmethyl)dibenzo [a,d]-[1,4]cyclooctadiene.
3. The hydrochloride salt of 5-(N-methyl-3'-pyrrolidylmethyl)dibenzo [a,d][1,4]cyclooctadiene.

References Cited in the file of this patent
UNITED STATES PATENTS

| | | |
|---|---|---|
| 2,951,082 | Sprague et al. | Aug. 30, 1960 |
| 2,985,660 | Judd et al. | May 23, 1961 |
| 3,014,911 | Engehardt | Dec. 26, 1961 |

OTHER REFERENCES

Winthrop et al.: J. Org. Chem., vol. 27, pp. 230–240 (Jan. 18, 1962).